United States Patent
Rao et al.

(10) Patent No.: US 9,250,819 B2
(45) Date of Patent: Feb. 2, 2016

(54) LEARNING MACHINE TO OPTIMIZE RANDOM ACCESS IN A STORAGE SYSTEM

(71) Applicant: DELL PRODUCTS L.P., Round Rock, TX (US)

(72) Inventors: Goutham Rao, Los Altos, CA (US); Vinod Jayaraman, San Francisco, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 240 days.

(21) Appl. No.: 13/784,575

(22) Filed: Mar. 4, 2013

(65) Prior Publication Data

US 2014/0250281 A1    Sep. 4, 2014

(51) Int. Cl.
  *G06F 3/06*   (2006.01)
  *G06F 12/02*  (2006.01)
  *G06F 11/30*  (2006.01)

(52) U.S. Cl.
  CPC .............. *G06F 3/0622* (2013.01); *G06F 3/064* (2013.01); *G06F 3/0683* (2013.01); *G06F 12/0223* (2013.01); *G06F 3/0641* (2013.01); *G06F 11/3034* (2013.01); *G06F 2206/1004* (2013.01)

(58) Field of Classification Search
  CPC ....... G06F 3/061; G06F 7/24; G06F 11/3034; G06F 12/0223
  See application file for complete search history.

(56) References Cited

U.S. PATENT DOCUMENTS

| | | | |
|---|---|---|---|
| 8,683,484 B2* | 3/2014 | Srinivasan | 718/105 |
| 2011/0208737 A1* | 8/2011 | Shmueli et al. | 707/737 |
| 2012/0131025 A1* | 5/2012 | Cheung et al. | 707/755 |
| 2012/0166448 A1* | 6/2012 | Li et al. | 707/747 |
| 2012/0179723 A1* | 7/2012 | Lin et al. | 707/792 |
| 2014/0188868 A1* | 7/2014 | Hunter et al. | 707/736 |
| 2014/0244937 A1* | 8/2014 | Bloomstein et al. | 711/136 |

OTHER PUBLICATIONS

Dubois, Laura et al., "Backup and Recovery: Accelerating Efficiency and Driving Down IT Costs Using Data Deduplication", White Paper, IDC, Retrieved from the Internet: <http://www.usicorp.com/Doc/USI%20White%20Papers/idc-20090519-data-deduplication.pdf (Feb. 1, 2010)>, Accessed on Dec. 29, 2013, Feb. 2010, 16 pgs.

Lillibridge, Mark et al., "Sparse Indexing: Large Scale, Inline Deduplication Using Sampling and Locality", HP Laboratories, Retrieved from the Internet: <http://www.hpl.hp.com/techreports/2009/HPL-2009-122.pdf>, Accessed on Dec. 29, 2013, Jun. 6, 2009, 14 pgs.

(Continued)

*Primary Examiner* — Hal Schnee
(74) *Attorney, Agent, or Firm* — Kwan & Olynick LLP

(57) ABSTRACT

Mechanisms are provided for optimizing random access in a storage system. According to various embodiments, an access pattern may be identified for a plurality of data segments stored in a first arrangement on a storage medium. Each of the plurality of data segments may be stored at a respective first storage location on the storage medium in the first arrangement. The access pattern may indicate an order in which the data segments are likely to be retrieved from the storage medium. The plurality of data segments may be stored in a second arrangement on the storage medium based on the identified access pattern. Each of the plurality of data segments may be stored at a respective second storage location on the storage medium in the updated arrangement.

17 Claims, 6 Drawing Sheets

(56) References Cited

OTHER PUBLICATIONS

Sarawagi, Sunita et al., "Interactive Deduplication using Active Learning", ACM 1-58113-567-X/02/0007, Retrieved from the Internet: <http://www.it.iitb.ac.in/~sunita/papers/kdd02.pdf>, Accessed on Dec. 29, 2013, Jul. 21, 2002, 10 pgs.

Yang, Tianming et al., "DEBAR: A Scalable High-Performance Deduplication Storage System for Backup and Archiving", CSE Technical Reports, University of Nebraska-Lincoln, Retrieved from the Internet: <http://digitalcommons.unl.edu/cgi/viewcontent.cgi?article=1059&context=csetechreports>, Accessed on Dec. 29, 2013, Jan. 5, 2009, 20 pgs.

* cited by examiner

LEARNING MACHINE TO OPTIMIZE RANDOM ACCESS IN A STORAGE SYSTEM

TECHNICAL FIELD

The present disclosure relates to the optimization of access in a random storage system.

DESCRIPTION OF RELATED ART

Data is often stored in storage systems that include various storage devices such as magnetic or optical disks. Data may be stored in a storage system in segments or fragments rather than whole files. Data segments may be spread across different portions of a storage system or may be stored in contiguous blocks. In either situation, data segments may often be accessed in sequences different from the order in which the segments are stored.

Many storage systems may be configured to read an entire block of contiguous data segments at once. For instance, when a magnetic disk drive receives a request to read a particular data segment, the disk drive may move a disk head to a data block on a magnetic disk or platter that contains the requested data segment and then may read the entire block. Then, in order to read a different data segment stored in another data block, the magnetic disk drive must move the disk head to the other data block. Other types of storage systems, such as those that include optical disks that are read with lasers, may operate in a similar fashion. Furthermore, moving the disk head or laser to a distance portion of the disk may in some instances be more expensive than moving the disk head or laser to a nearby data block.

In many storage systems, accessing contiguous blocks of data is often less resource-intensive than accessing blocks of data stored in different portions of the storage system. If two data segments are stored in the same block of data on a disk in a disk drive, they may be read at one time by the disk drive. However, if the two data segments are stored in different blocks of data on the disk, then the disk drive will need to move the disk head between the two blocks to read both data segments.

Access time to data stored in storage systems is often a significant bottleneck to improved computing performance. However, mechanisms for providing reduced access time to data stored on desk are limited. For instance, conventional defragmentation techniques may provide only limited improvements to data access time. Consequently, techniques and mechanisms are provided to improve access times to data stored in a storage system.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
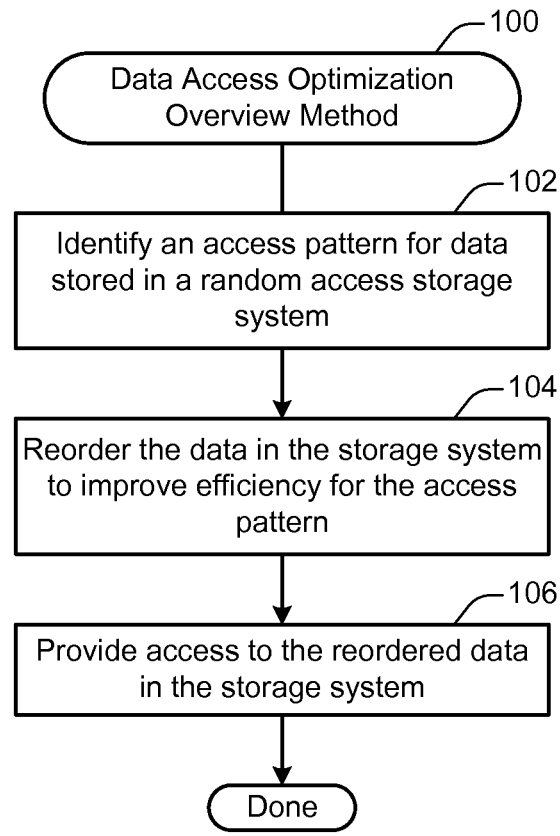
FIG. 1 illustrates a particular example of an overview method for memory access optimization.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms are provided for improving the efficiency of access to information stored on storage mediums. Many storage mediums, such as magnetic storage mediums, have high random access latency in comparison to sequential access. However, certain workflows such as booting an operating system, accessing a virtual machine, mounting a file system, and reading a compound document format result in random access of data segments. Furthermore, many such workflows or data segments are accessed in substantially the same pattern over potentially many successive accesses. According to various embodiments, data segments that are accessed in substantially the same pattern over successive accesses may be identified and reordered on a storage medium to improve the efficiency of future accesses. A learning algorithm may be used to identify data segment access patterns. Data segments may then be defragmented or rearranged to be laid out sequentially with respect to an access pattern rather than in some other arrangement, such as an offset order. Such an arrangement may allow for substantially sequential access of the data segments, which may in at least some instances provide significantly reduced access time of the data segments.

Example Embodiments

In many instances, data segments that make up files stored on storage systems are accessed in an order different than the order in which they are initially stored. For instance, data segments may initially be stored almost at random, wherever a storage system has available storage space. Alternately, data segments may be stored in a way that reflects a logical or structural arrangement of the data. However, the data may be accessed in a very different order when the system is accomplishing a particular task, such as booting an operating system or opening a file.

For example, data segments that include information used to boot up an operating system may be stored in a way that reflects a logical ordering or organization of operating system information, while the information may be accessed in a sequence that reflects boot up dependencies and priorities. As another example, data segments that include information used to form a document implemented in a compound document format such as PDF or Doc may be stored in a way that reflects the structure of the compound document format. However, the data segments may be accessed in a different order, such as an access order that reflects the priorities of an access program such as Adobe PDF or Microsoft Word when the access program is reading and presenting the document. Thus, leaving data segments arranged in the way in which they are initially stored may in many cases result in suboptimal access times during subsequent access to the data segments.

According to various embodiments, a defragmentation or other data reordering program may be used to arrange and/or rearrange information stored on a storage medium. The defragmentation algorithm may analyze the data stored on a storage system and reorder the data to improve efficiency. For instance, the defragmentation algorithm may identify different data segments that are part of the same file or group of files but that are stored in different areas of the storage system. The defragmentation algorithm may then copy or rearrange the data stored in the storage system so that these data segments that are part of the same file or group of files are also stored close to each other in the storage system.

According to various embodiments, an analysis algorithm may be used to provide input to the defragmentation system. The analysis algorithm may identify groups of data segments stored in the storage system that are commonly accessed in a particular sequence or that are likely to be accessed in a particular sequence. The analysis information may then make this information available to the defragmentation system, which may then reorder the data in the storage system in a way that reflects the identified access sequence for the data segments.

According to various embodiments, the analysis algorithm may be a learning algorithm, a content-based analysis algorithm, or any other type of algorithm. For instance, a learning algorithm may observe or record the actual pattern of data access when a file or group of files stored on a storage system are accessed. Alternately, or additionally, a content-based analysis algorithm may predict a data access pattern based on the type of file being analyzed, since some types of files may typically be accessed in one or more predictable data access patterns.

According to various embodiments, when the defragmentation or other data organization procedure reorders the data on the storage system based on the analysis algorithm, access times for future access to the optimized data segments may be reduced. For instance, instead of reading a group of data segments that are located separately at different, even distance areas of the storage system, the storage system may read one or more contiguous or nearly continuous blocks of data segments.

According to various embodiments, techniques and mechanisms described herein may be applied at various storage system levels of abstraction. For example, data access patterns may be analyzed at the file level. For instance, an access pattern for one or more specific data files may be identified and/or optimized. As another example, data access patterns may be analyzed at the block or data segment level. For instance, optimization may be agnostic as to how data blocks are grouped into files. Instead, access patterns of groups of blocks may be identified and/or optimized. In particular embodiments, techniques and mechanisms described herein may be applied at any or all levels of abstraction capable of being supported by the storage system, such as disk level, directory level, file level, block level, data segment level, or any other level. Different storage systems may have different characteristics, and the implementation of various techniques and mechanisms described herein may depend at least in part on these characteristics.

It should be noted that while the term "optimization" is used throughout the application, an optimized data storage system is not necessarily arranged in a perfect or best way. In any storage system, tradeoffs must be made between factors such as average access time, minimum access time, maximum access time, and storage space. Thus, an optimized data storage system is one that has been made more efficient in some sense, such as in terms of access time for frequently accessed groups of data segments. However, an optimized storage system may in some instances use a larger amount of storage space than a non-optimized storage system, or may even result in greater access time for some groups of data segments such as infrequently accessed groups of data segments.

FIG. 1 illustrates a particular example of an overview method 100 for memory access optimization. According to various embodiments, the method 100 may be used to identify access patterns for data in a storage system, reorder the data, and allow access to the reordered data. The method 100 may be implemented at a storage system, examples of which are discussed with respect to FIGS. 5 and 6. The method 100 may be run periodically, upon request, at scheduled times, or continuously on the storage system. The method may be used when data is first stored, when data is reorganized (e.g., during a defragmentation or deduplication algorithm), or at any other time. The method may be used to arrange all or a portion of the data stored in the storage system. For instance, the method may be used to optimize the access of frequently accessed data segments.

At 102, an access pattern for data stored in a random storage system is identified. According to various embodiments, various techniques may be used to identify access patterns. For example, a learning algorithm may observe data access within the storage system, either live or by analyzing access records, and identify access patterns over time. As another example, a content-based analysis algorithm may identify groups of data segments based on data content that are typically accessed in a particular order. For instance, data that makes up documents stored in accordance with some compound document formats are often accessed in particular sequences. Examples of techniques for identifying access patterns for data are discussed in further detail with respect to FIG. 3.

At 104, the data in the storage system is reordered to improve efficiency for the access pattern. According to various embodiments, reordering the data may involve any of various storage-related operations. For instance, data may be moved from one area of a storage system to another, duplicated, de-duplicated, copied, or deleted to organize the data identified in the access pattern.

According to various embodiments, after the data is reordered, at least some of the data accessed as part of the identified access pattern may be arranged to facilitate sequential access. For example, a group of data segments may be commonly accessed in a sequential ordering but before reordering may be scattered across the storage system. These segments may be copied or moved such that after reordering they are arranged in a contiguous or nearly contiguous block. Examples of techniques for reordering data in a storage system are discussed in further detail with respect to FIG. 4.

At 106, access to the reordered data in the storage system is provided. According to various embodiments, the data may be accessed as part of the normal operation of the storage system. For instance, the data stored on the storage system may be accessed to boot an operating system, access a virtual machine, mount a file system, read a document, or for any other purpose.

According to various embodiments, at least some of the data stored on the storage system may be accessed in a sequence identical or similar to that identified at operation 102 to take advantage of the reordering described with respect to operation 104. This sequential access may be in some instances considerably faster than access to the same data before the data was reordered in operation 104.

Figure 2:
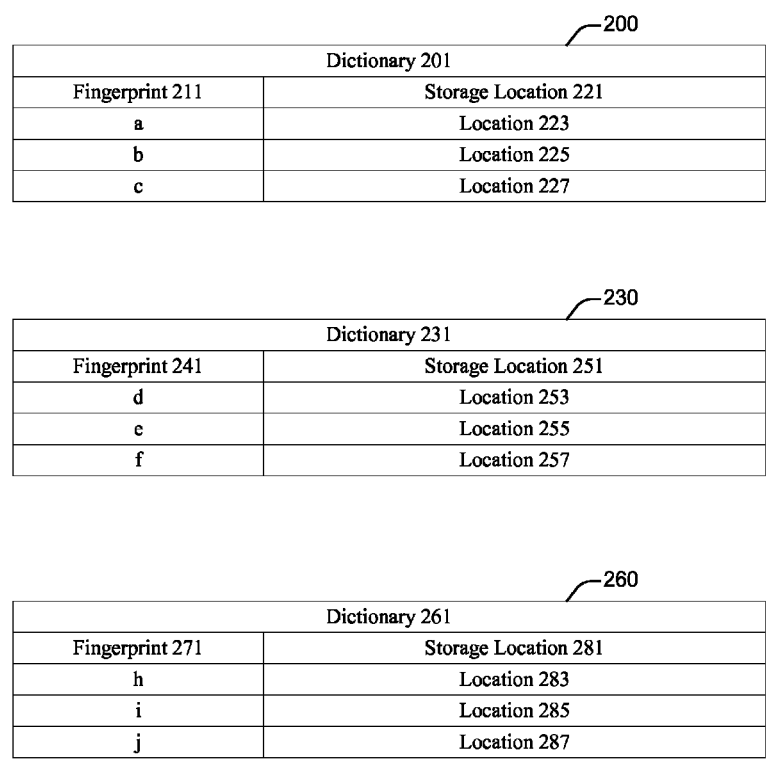
FIG. 2 illustrates a particular example of an arrangement of data segments among a set of data stores.

FIG. 2 illustrates a particular example of an arrangement of data segments among a set of data stores. The example shown in FIG. 2 includes three data stores 200, 230, and 260. Each data store also includes a set of data segments. The data stores also each include a respective data dictionary 201, 231, and 261 that identifies the data fingerprints and storage locations of data segments stored in the data store. Each data segment is associated with a respective fingerprint, indicated in a respective fingerprint column 211, 241, and 271. Each data segment is also associated with a storage location, indicated in a respective storage location column 221.

According to various embodiments, each data store is configured to store an amount of data. The amount of data may be different in different storage systems. The amount of data stored in a data store may be divided among a number of different data segments. In particular embodiments, different data segments may be of different sizes. Alternately, in some storage systems data segments may be of similar or identical sizes.

According to various embodiments, each data segment is stored at a particular storage location within the associated data store. For instance, the data store 200 has data stored at locations 223, 225, and 227. The data store 230 has data stored at locations 253, 255, and 257. The data store 260 has data stored at locations 283, 285, and 287. The data location may be a particular address within the storage system at which a data segment is located.

According to various embodiments, each data segment is associated with a particular fingerprint. The fingerprint serves as an identifier for a data segment. In different storage systems, fingerprints may be assigned in different ways. For example, fingerprints may be assigned as part of a sequential numbering technique. As another example, a fingerprint may be a hash or other transformation of the data stored in the storage block.

According to various embodiments, each data dictionary describes the data segments stored within the associated data store. For instance, each data dictionary may describe each data segment stored in the data store by way of a fingerprint/storage location pair. A data dictionary may describe where to access each data segment stored in the data store. For example, if a request is transmitted to access a data segment stored on the data store, the data segment may be identified based on the data dictionary associated with the data store. For instance, the request may indicate a particular fingerprint associated with a data segment stored in the data store.

According to various embodiments, a data segment may be any collection of bits of data. The data segment may be stored in an area of memory on a storage system. For instance, the data segment may be stored in a block or blocks of memory on an optical disk drive. In some storage systems, data segments may be of fixed size. In other storage systems, different data segments may be of different sizes. Techniques and mechanisms described herein may be applied in conjunction with various types of data segments, including fixed-sized or variable-sized data segments.

According to various embodiments, the information stored in the data segment may be any information capable of being used by a computing system. For instance, the information may be part or all of a file, of configuration information, of operating system information, of a program such as a virtual machine or web browser, of file system data, or any other information.

According to various embodiments, data segments may be accessed in various orders. For instance, at least some of the data segments shown in FIG. 2 may be associated with a data file such as a document. As described herein, in many instances data may be stored in a different order from the order in which it is most often accessed. For example, the data may be stored in an ordering that is determined based on the order in which the data is organized in the data file or the order in which the data is received for storage in the storage system. However, the data segments may be tend to be accessed in a different order when the data file is read from memory. The data segments may be read in a sequential order in some instances, such as copying from one storage system or location to another storage system or location. However, in other instances, such as opening the file in a document reader, the data segments may be accessed in a different order. For example, when the data file is opened in a document reader, the data segments may tend to be accessed in an ordering corresponding to the fingerprints "a c e i". In order to access these four segments, all three data stores must be accessed.

According to various embodiments, accessing two data segments stored on the same data store may require less access time and a lower usage of computing resources than accessing the same two data segments if they are stored on the same data store. In order to provide improved efficiency, as described herein, data segments may be rearranged based on expected access patterns. For instance, in the example shown in FIG. 2, the data segments corresponding with the fingerprints "a c e i" may be moved to a single data store, such as the data store 200. Then, if necessary, data segments stored in FIG. 2, such as the data segment associated with the fingerprint b, may be moved to a different data store. After this rearrangement, the data segments may be stored in an order that is more likely to reflect future access patterns, such as an opening of the data file. Accordingly, the post-rearrangement ordering of the data segments may result in lower access times for the data segments, on average.

The arrangement of data segments shown in FIG. 2 is an example shown for purposes of illustration. It should be noted that although only three data stores and nine file segments are shown in FIG. 2, a typical data storage system includes many more data stores and file segments.

Figure 3:
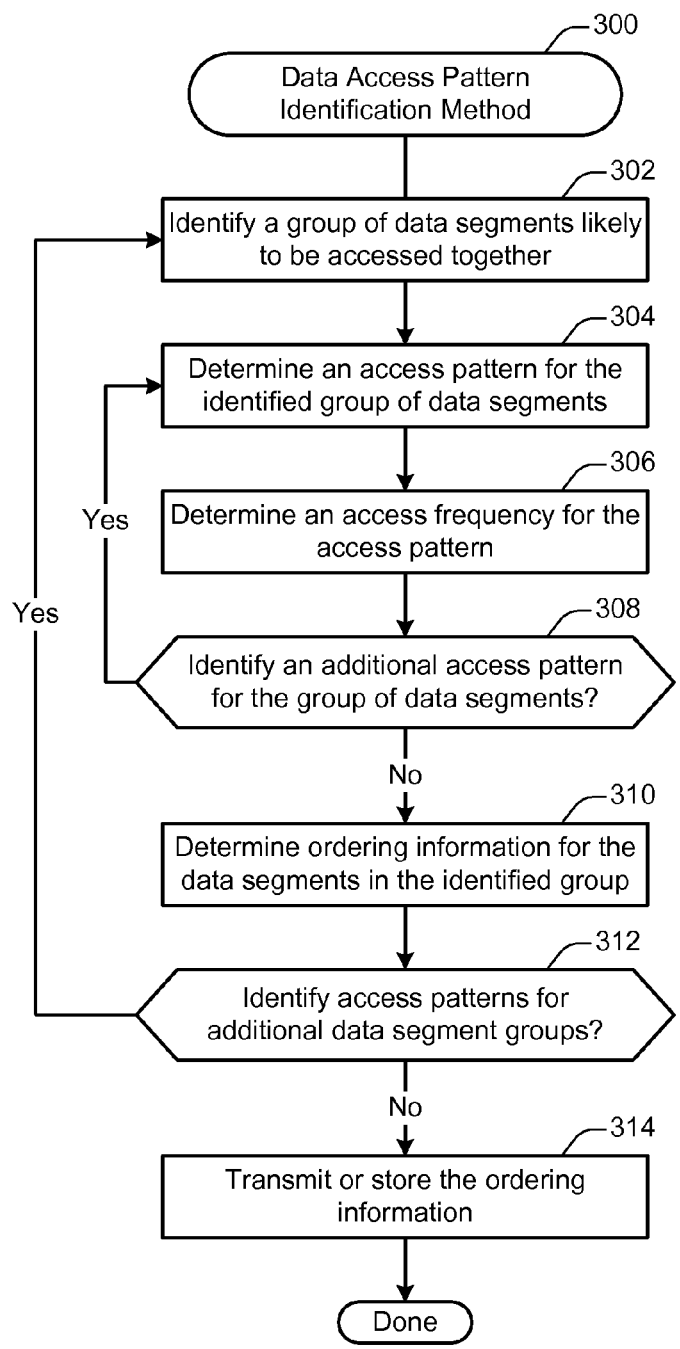
FIG. 3 illustrates a particular example of a method for identifying data access patterns.

FIG. 3 illustrates a particular example of a method 300 for identifying data access patterns. According to various embodiments, the method 300 may be implemented at a storage system, examples of which are discussed with respect to FIGS. 5 and 6. The method 300 may be run periodically, upon request, at scheduled times, or continuously on the storage system. The method may be used when data is first stored, when data is reorganized (e.g., during a defragmentation or deduplication algorithm), or at any other time. The method may be used to analyze all or a portion of the data stored in the storage system. For instance, the method may be used to determine ordering information for optimizing the access of frequently accessed data segments.

In particular embodiments, a data access pattern identification method may be implemented at least in part as a learning algorithm. A learning algorithm may evaluate information describing how data on a storage system are actually accessed to "learn" frequent access patterns. The learning algorithm may operate in substantially real time or periodically by examining log information. In particular embodiments, the learning algorithm may build an estimate of access patterns or optimized data arrangements and then update this estimate over time as part of an iterative learning process.

In particular embodiments, a data access pattern identification method may be implemented at least in part as a content-based data analysis method. A content-based data analysis method may identify the types of files and programs that are represented by different groups of data segments. For instance, a content-based data analysis method may identify a document, a program, or configuration information as a cohesive unit. Then, the content-based data analysis method may identify the different data segments that make up the identified unit. Next, the content-based data analysis method may determine a likely access pattern for the data segments in the unit.

According to various embodiments, a likely access pattern may be identified by a content-based data analysis method for the unit based on any of a variety of information. For example, a likely access pattern may be identified based at least in part on past observed information, such as an estimate from a learning algorithm for similar files, programs or configuration information. As another example, a likely access pattern may be identified based at least in part on predetermined access pattern information provided to the content-based analysis, such as predetermined access pattern information retrieved from a server or stored for pattern analysis purposes.

At 302, a group of data segments likely to be accessed together are identified. According to various embodiments, the group of data segments may be identified by any or a combination of a variety of data analysis techniques, such as content-based data analysis and learning-based analysis techniques. For example, the data stored on the storage system may be analyzed to identify groups of data segments that together make up a file, a set of file system mounting information, information for initializing a program such as a virtual machine or web browser, or boot up information for an operating system. As another example, data access information, such as storage system records, may be analyzed to identify groups of data segments that are frequently accessed together.

At 304, an access pattern for the identified group of data segments is determined. According to various embodiments, the access pattern may be determined in any of various ways. For example, the system may track data access over time and log the data access or analyze it as data is accessed. As another example, the system may analyze data stored in the storage system to identify based on content type groups of data segments that are likely to be accessed in a particular order. For instance, a data for instantiating a particular type of virtual machine may be known to be accessed in a particular access pattern. As yet another example, some combination of observed data access analysis and data content analysis may be used to identify the access pattern.

At 306, a determination is made as to whether to identify an additional access pattern for the group of data segments. According to various embodiments, a group of data segments may be associated with a single access pattern or any number of access patterns. For instance, data segments that represent a document file may be accessed in different patterns by different document reading programs. In particular embodiments, the most common, frequent, or likely access pattern may be identified for the group of data segments. Alternately, potentially many different access patterns may be identified for the group of data segments. For instance, all access patterns that occur with a designated frequency may be identified.

At 308, a determination is made as to whether to identify additional access patterns for the group of data segments. According to various embodiments, a single group of data segments may be associated with different access patterns. For instance, a file that implements a compound document format may be made up of many different data segments and may be opened by any of several different programs configured to read files that implement the compound document format. These different programs may exhibit different access patterns when retrieving the data segments that make up the file. In some instances, one program or access pattern may be significantly more common than the others. However, in other instances several different access patterns may be relatively common Access to the data file may be optimized based on any or all of the access patterns associated with a group of data segments.

At 310, ordering information for the data segments in the identified group is determined. According to various embodiments, the ordering information may be used to instruct the storage system as to how to arrange the data segments to facilitate efficient access to the data. For instance, the ordering information may specify an order in which the data segments in the group should be stored.

According to various embodiments, the ordering information may reflect access patterns for data segments for the group, access patterns for data segments not in the group, information about the storage system such as capacity data, and/or any other information. For instance, a group of data segments may be associated with a particular access pattern. However, several data segments in the group may also be members of other data segment groups, which may have conflicting access patterns. Accordingly, the ordering information may reflect these various access patterns as well as any other information that may affect the optimization process.

According to various embodiments, the ordering information may reflect access frequency for any access patterns identified for a group of data segments. For example, a group of data segments may be accessed according to several different access patterns, but one of the access patterns may be much more common than the others. In this case, the most common access pattern may be selected for optimization. As another example, a group of data segments may be accessed according to several access patterns that are all relatively common. In this case, the group of data segments may be optimized so as to reflect, as much as possible, the different access patterns. This may involve calculating a single pattern that may be used to support, at least in part, different access patterns. Alternately, or additionally, at least some data may be duplicated in the storage system to better support conflicting access patterns.

According to various embodiments, the ordering information may be based on any access pattern determined for the group of data segments. For example, the ordering information may be used to instruct the storage system to arrange the data segments in an order corresponding to the most frequent access order for the segments. As another example, the ordering information may be used to instruct the storage system to arrange the data segments in an order that provides relatively good access time for two different common access patterns for the group of data segments.

According to various embodiments, the ordering information may be used to instruct the storage system to perform any of a variety of tasks, such as storage management tasks related to data segments in the group. For example, the ordering information may indicate that at least some of the data segments in the grouped should be moved. For instance, data segments may be moved so that they are arranged in one or more contiguous blocks that reflect one or more common access patterns for the data segments. As another example, the ordering information may indicate that at least some of the data segments in the group should be duplicated or copied. For instance, a group of data segments may be frequently accessed in two distinct access patterns. If storage space permits, the data segments in the group may be stored twice, arranged different for the two access patterns.

At 312, a determination is made as to whether to identify access patterns for additional data segment groups. According to various embodiments, access patterns may be identified for any data segments stored on the storage system. For example, likely instances of repeated access patterns may be stored or flagged by the storage system for analysis. As another example, each data segment may be analyzed to determine whether it is a member of a group of frequently accessed data segments. As yet another example, a data segment that is frequently accessed may be analyzed to determine whether it is a member of a group of frequently accessed data segments. As still another example, groups of files that may be expected to exhibit predictable access patterns based on the data content may be analyzed to identify likely access patterns. Such groups of files may include, but are not limited to, some compound document formats, operating system boot sequences, virtual machine programming language instructions, and file system mounting information.

At 314, the ordering information is transmitted or stored. According to various embodiments, the ordering information may be transmitted via a network or stored on a storage device. The transmitted or stored ordering information may be used in conjunction with a data segment reordering method that rearranges data segments on the storage system based at least in part on the ordering system. Examples of techniques for reordering data segments are discussed with respect to FIG. 4.

Figure 4:
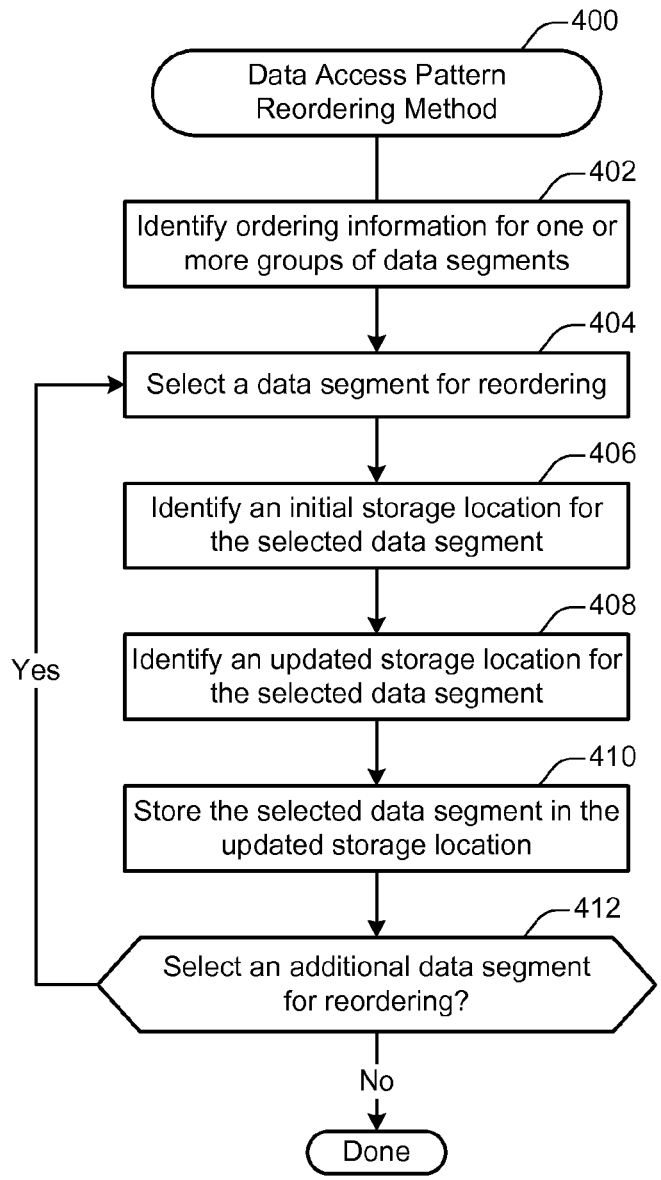
FIG. 4 illustrates a particular example of a method for optimizing memory access.

FIG. 4 illustrates a particular example of a method 400 for optimizing memory access. According to various embodiments, the method 400 may be implemented at a storage system, examples of which are discussed with respect to FIGS. 5 and 6. The method 400 may be run periodically, upon request, at scheduled times, or continuously on the storage system. The method may be used when data is first stored, when data is reorganized (e.g., during a defragmentation or deduplication algorithm), or at any other time. The method may be used to reorder or organize all or a portion of the data stored in the storage system. For instance, the method may be used to reorder frequently accessed data segments to optimize access.

At 402, ordering information for one or more groups of data segments is identified. According to various embodiments, the ordering information may be used to instruct the storage system as to how to arrange data segments for storage on the data system to facilitate efficient access to the data. For instance, the ordering information may specify an order such as an absolute or relative location at which one or more data segments should be stored. The ordering information may be generated as discussed with respect to FIG. 3.

At 404, a data segment is selected for reordering. According to various embodiments, the data segment may be selected by identifying a data segment indicated by the ordering information identified at operation 402. The data segment may be one in which an optimal or recommended storage location for the data segment differs from the current storage location. The selected data segment may thus be a candidate for moving or copying to a new location in order to improve access time when the data segment is retrieved in accordance with a designated access pattern.

At 406, an initial storage location for the selected data segment is identified. According to various embodiments, the initial storage location may be included in the ordering information identified at operation 402. Alternately, or additionally, the initial storage location may be identified by accessing a data directory or other index of the storage system.

At 408, an updated storage location for the selected data segment is identified. According to various embodiments, the updated storage location may be identified by analyzing the ordering information identified at operation 402. The ordering information may indicate an absolute or relative location for storing the selected data segment. For instance, the ordering information may designate a particular address on a disk within the storage system at which the selected data segment should be stored.

In particular embodiments, the ordering information may indicate a relative storage location. For instance, the ordering information may indicate that the selected data segment should be stored near (e.g., in the same block or data store) as one or more other data segments. In this example, the ordering information may be combined with initial and/or updated ordering or storage location information associated with other data segments to determine where to store the selected data segment. For instance, several data segments located at different locations in the storage system may all be moved to a new, contiguous storage location (e.g., the same block). Alternately, one or more data segments may be moved to a storage location that is near (e.g., within the same block) the initial location of another data segment.

At 410, the selected data segment is stored in the updated storage location. According to various embodiments, the selected data segment may be either moved or copied to the updated storage location. If the data segment is copied, then a copy of the data segment remains in place at the previous location. If instead the data segment is moved, then the previous location of the data segment is freed for storing other data.

According to various embodiments, moving or copying the selected data segment to the updated storage location may involve manipulating information that is already stored at the updated storage location. For instance, the ordering information may indicate that the selected data segment should be stored in a storage location already occupied by other data. To store the selected data segment without losing data, the data already stored at the updated storage location may first be moved to a different storage location.

According to various embodiments, storing the selected data segment may involve updating a data directory or other index of the storage system. For instance, the storage system may include many different data segments stored at many different locations. To locate particular data segments, a data directory or other index may be maintained. The data directory or index may identify which data is stored at which storage location so that the data stored in the storage system may be accessed or searched.

In particular embodiments, each data segment may be stored in a data store, as discussed with respect to FIG. 2. Each data store may contain a block or group of data segments. In order to access a data segment, the data store storing the data segment may be identified by accessing the data dictionary. Then, a request to access the data segment may be transmitted to the data store.

At 412, a determination is made as to whether to select an additional data segment for reordering. According to various embodiments, the determination may be made at least in part on the ordering information identified at operation 402. The ordering information identified at operation 402 may indicate which data segments should be moved or copied to new locations to optimize access time.

In particular embodiments, the determination as to whether to select an additional data segment for reordering may be made at least in part based on features of the storage system such as total storage capacity, storage capacity currently in use, and other such properties. For instance, in some cases duplicate copies of a data segment may be stored in order to support improved access times for two different access patterns that retrieve the data segment. However, such duplication may be impractical if the storage system has a limited amount of unused storage capacity.

Figure 5:
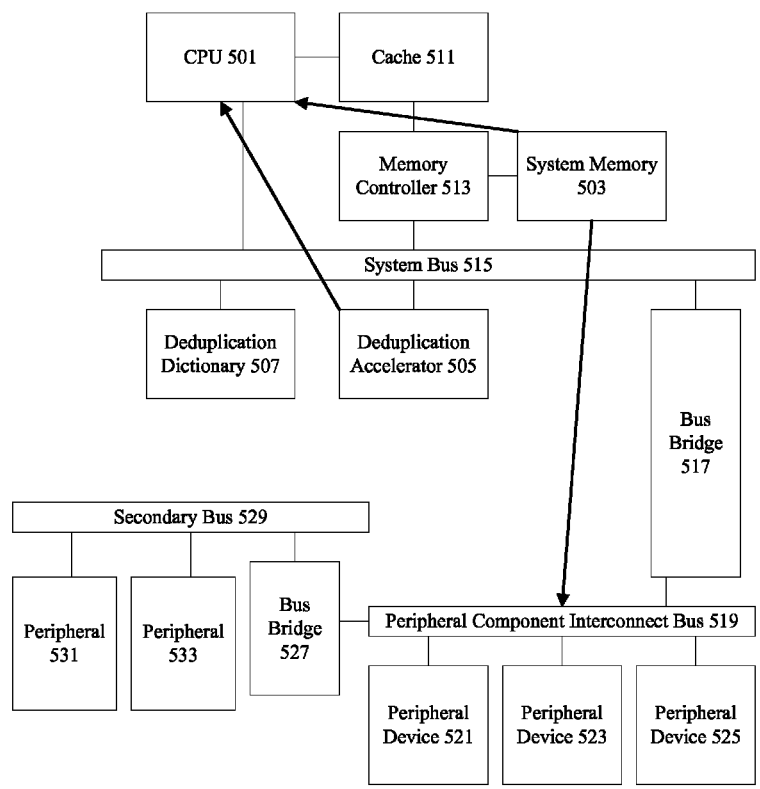
FIG. 5 illustrates a particular example of a system that can use the techniques and mechanisms of the present invention.

FIG. 5 illustrates a particular example of a system that can use the techniques and mechanisms of the present invention. According to various embodiments, data is received at an accelerated deduplication system 500 over an interface such as a network interface. A data stream may be received in segments or blocks and maintained in system memory 503. According to various embodiments, a processor or CPU 501 maintains a state machine but offloads boundary detection and fingerprinting to a deduplication engine or deduplication accelerator 505. The CPU 501 is associated with cache 511 and memory controller 513. According to various embodiments, cache 511 and memory controller 513 may be integrated onto the CPU 501.

In particular embodiments, the deduplication engine or deduplication accelerator 505 is connected to the CPU 501 over a system bus 515 and detects boundaries using an algorithm such as Rabin to delineate segments of data in system memory 503 and generates fingerprints using algorithms such as hashing algorithms like SHA-1 or MD-5. The deduplication engine 505 accesses the deduplication dictionary 507 to determine if a fingerprint is already included in the deduplication dictionary 507. According to various embodiments, the deduplication dictionary 507 is maintained in persistent storage and maps segment fingerprints to segment storage locations. In particular embodiments, segment storage locations are maintained in fixed size extents. Data store suitcases, references, metadata, etc., may be created or modified based on the result of the dictionary lookup.

If the data needs to be transferred to persistent storage, the optimization software stack will communicate to the CPU 501 the final destination direct memory access (DMA) addresses for the data. The DMA addresses can then be used to transfer the data through one or more bus bridges 517 and/or 527 and secondary buses 519 and/or 529. In example of a secondary bus is a peripheral component interconnect (PCI) bus 519. Peripherals 521, 523, 525, 531, and 533 may be peripheral components and/or peripheral interfaces such as disk arrays, network interfaces, serial interfaces, timers, tape devices, etc.

Figure 6:
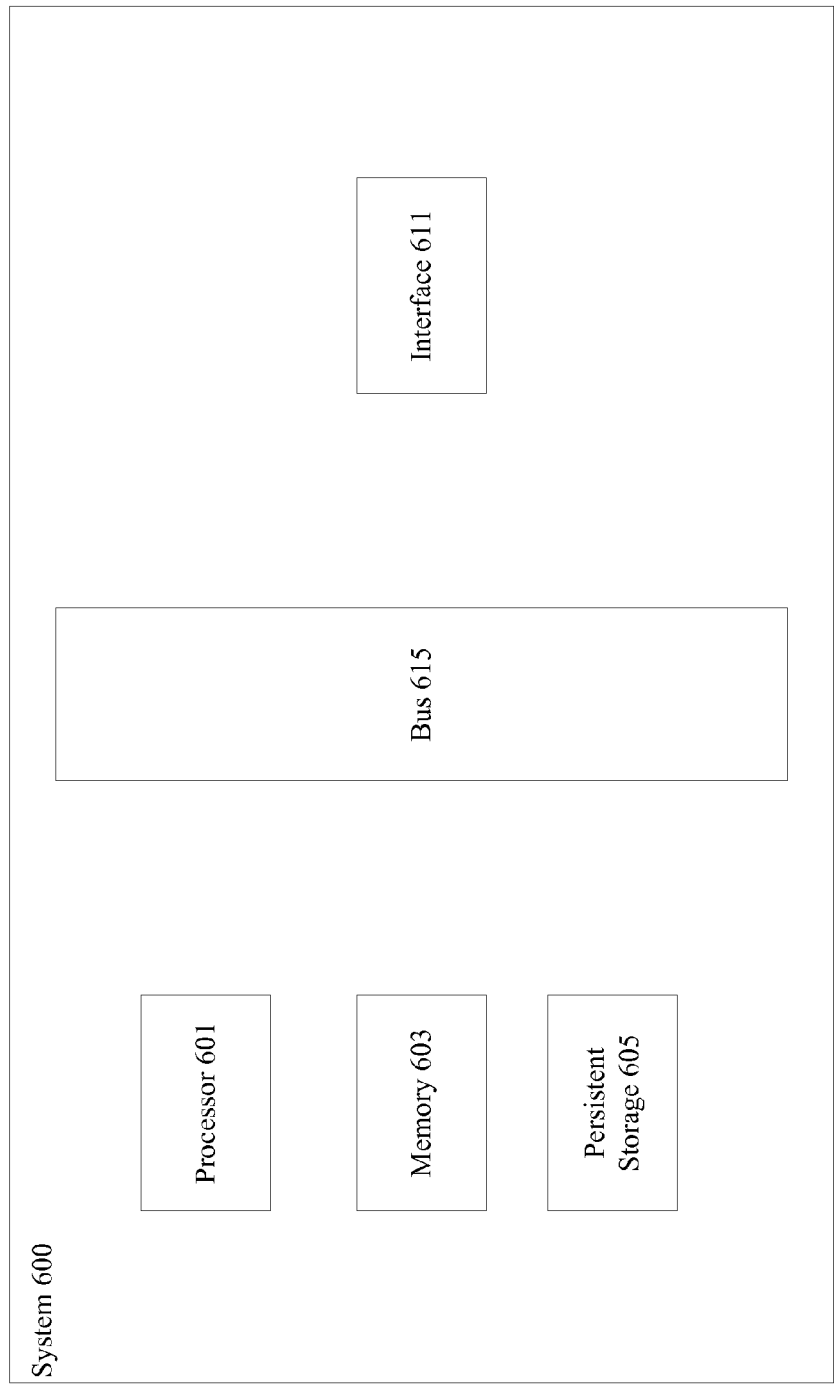
FIG. 6 illustrates a particular example of a storage system.

A variety of devices and applications can implement particular examples of the present invention. FIG. 6 illustrates one example of a system that can be used as a storage node in a deduplication system. According to particular example embodiments, a system 600 suitable for implementing particular embodiments of the present invention includes a processor 601, a memory 603, an interface 611, persistent storage 605, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 605 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
identifying and recording an access pattern for a plurality of data segments stored in a first arrangement on a storage medium, the plurality of data segments including a designated set of data segments that have been deduplicated, each of the plurality of data segments being stored at a respective first storage location on the storage medium in the first arrangement, the identified access pattern indicating a sequence in which the data segments are likely to be retrieved from the storage medium, wherein recording the access pattern includes recording a frequency with which the access pattern has occurred, wherein recording the access pattern further includes identifying a designated content type associated with the plurality of data segments, the designated content type being one of a plurality of content types, and wherein the access pattern is identified at least in part based on at least a partial match with a typical access pattern associated with the designated content type; and
storing the plurality of data segments in a second arrangement on the storage medium based on the identified access pattern, each of the plurality of data segments being stored at a respective second storage location on the storage medium in the second arrangement, the respective first storage location being different than the respective second storage location for one or more of the plurality of data segments, wherein storing the plurality of data segments includes storing a duplicate copy of at least one of the designated set of data segments that have been deduplicated.

2. The method recited in claim 1, wherein accessing the plurality of data segments substantially in accordance with the identified access pattern is faster under the second arrangement than under the first arrangement.

3. The method recited in claim 1, wherein identifying the access pattern comprises:
analyzing first data access information describing one or more previous instances of retrieval of the plurality of data segments from the storage medium.

4. The method recited in claim 3, wherein identifying the access pattern further comprises:
computing an estimate of the access pattern based on the first data access information.

5. The method recited in claim 4, wherein identifying the access pattern further comprises:
analyzing second data access information describing one or more previous instances of retrieval of the plurality of data segments from the storage medium, and
computing an updated estimate of the access pattern based on the second data access information as part of an iterative learning process.

6. The method recited in claim 1, wherein identifying the access pattern further comprises:
receiving predetermined access pattern information associated with the identified content type.

7. The method recited in claim 6, wherein the predetermined access pattern information indicates one or more likely access patterns for the identified content types, the one or more likely access patterns including the identified access pattern.

8. The method recited in claim 1, wherein storing the plurality of data segments in the second arrangement comprises:
moving each of the plurality of data segments from the respective first storage location to the respective second storage location when the respective first storage location is different than the respective second storage location.

9. A system comprising:
a storage module configured to store a plurality of data segments stored in a first arrangement, the plurality of data segments including a designated set of data segments that have been deduplicated, each of the plurality of data segments being stored at a respective first storage location on the storage module in the first arrangement; and
a processor configured to:
identify and record an access pattern for the plurality of data segments, the access pattern indicating a sequence in which the data segments are likely to be retrieved from the storage module, wherein recording the access pattern includes recording a frequency with which the access pattern has occurred, wherein recording the access pattern further includes identifying a designated content type associated with the plurality of data segments, the designated content type being one of a plurality of content types, and wherein the access pattern is identified at least in part based on at least a partial match with a typical access pattern associated with the designated content type, and
transmit an instruction to store the plurality of data segments in a second arrangement on the storage medium based on the identified access pattern, each of the plurality of data segments being stored at a respective second storage location on the storage medium in the second arrangement, the respective first storage location being different than the respective second storage location for one or more of the plurality of data segments, wherein storing the plurality of data segments includes storing a duplicate copy of at least one of the designated set of data segments that have been deduplicated.

10. The system recited in claim 9, wherein accessing the plurality of data segments substantially in accordance with the identified access pattern is faster under the second arrangement than under the first arrangement.

11. The system recited in claim 9, wherein identifying the access pattern comprises:
analyzing data access information describing one or more previous instances of retrieval of the plurality of data segments from the storage module.

12. The system recited in claim 11, wherein identifying the access pattern further comprises:
computing an estimate of the access pattern based on the data access information.

13. The system recited in claim 9, wherein identifying the access pattern further comprises:
analyzing second data access information describing one or more previous instances of retrieval of the plurality of data segments from the storage module, and
computing an updated estimate of the access pattern based on the second data access information as part of an iterative learning process.

14. The system recited in claim 9, wherein identifying the access pattern further comprises:
receiving predetermined access pattern information associated with the identified content type.

15. The system recited in claim 14, wherein the predetermined access pattern information indicates one or more likely access patterns for the identified content types, the one or more likely access patterns including the identified access pattern.

16. One or more non-transitory computer readable media having instructions stored thereon for performing a method, the method comprising:

identifying and recording an access pattern for a plurality of data segments stored in a first arrangement on a storage medium, the plurality of data segments including a designated set of data segments that have been deduplicated, each of the plurality of data segments being stored at a respective first storage location on the storage medium in the first arrangement, the identified access pattern indicating a sequence in which the data segments are likely to be retrieved from the storage medium, wherein recording the access pattern includes recording a frequency with which the access pattern has occurred, wherein recording the access pattern further includes identifying a designated content type associated with the plurality of data segments, the designated content type being one of a plurality of content types, and wherein the access pattern is identified at least in part based on at least a partial match with a typical access pattern associated with the designated content type; and storing the plurality of data segments in a second arrangement on the storage medium based on the identified access pattern, each of the plurality of data segments being stored at a respective second storage location on the storage medium in the second arrangement, the respective first storage location being different than the respective second storage location for one or more of the plurality of data segments, wherein storing the plurality of data segments includes storing a duplicate copy of at least one of the designated set of data segments that have been deduplicated.

17. The one or more non-transitory computer readable media recited in claim 16, wherein accessing the plurality of data segments substantially in accordance with the identified access pattern is faster under the second arrangement than under the first arrangement.

\* \* \* \* \*